US005643506A

United States Patent [19]

Rourke

[11] Patent Number: 5,643,506
[45] Date of Patent: Jul. 1, 1997

[54] CONTINUOUS PRODUCTION OF EMULSIONS AND MICROCAPSULES OF UNIFORM PARTICLE SIZE

[75] Inventor: John K. Rourke, Chillicothe, Ohio

[73] Assignee: The Mead Corporation, Dayton, Ohio

[21] Appl. No.: 382,897

[22] Filed: Feb. 3, 1995

[51] Int. Cl.$^6$ .............................. B01J 13/02; B01J 13/04
[52] U.S. Cl. .............. 264/4.1; 252/319; 252/320; 252/327
[58] Field of Search .................. 106/170; 252/319, 252/320, 327, 318, 304; 264/4.1

[56] References Cited

U.S. PATENT DOCUMENTS

| | | | |
|---|---|---|---|
| 2,800,457 | 7/1957 | Green et al. | 252/316 |
| 3,015,128 | 2/1962 | Somerville, Jr. | 18/2.6 |
| 3,159,874 | 12/1964 | Langer et al. | 18/1 |
| 3,160,686 | 12/1964 | Doyle et al. | 264/4 |
| 3,202,533 | 8/1965 | Sachsel et al. | 117/72 |
| 3,208,951 | 9/1965 | Berger et al. | 252/316 |
| 3,270,100 | 8/1966 | Jolkovski et al. | 264/4 |
| 3,294,704 | 12/1966 | Langer et al. | 252/359 |
| 3,310,612 | 3/1967 | Somerville, Jr. | 264/4 |
| 3,423,489 | 1/1969 | Arens et al. | 264/4 |
| 3,464,926 | 9/1969 | Vandegaer et al. | 252/316 |
| 3,565,817 | 2/1971 | Lissant | 252/312 |
| 3,754,062 | 8/1973 | Kobayashi et al. | 264/4 |
| 3,812,056 | 5/1974 | Torriente et al. | 353/316 |
| 3,816,331 | 6/1974 | Brown, Jr. et al. | 252/316 |
| 3,875,074 | 4/1975 | Vassiliades et al. | 252/316 |
| 4,025,455 | 5/1977 | Shackle | 252/316 |
| 4,056,610 | 11/1977 | Barber, Jr. et al. | 424/32 |
| 4,171,981 | 10/1979 | Austin et al. | 106/14 |
| 4,218,409 | 8/1980 | Dannelly | 264/4 |
| 4,735,742 | 4/1988 | Ansmann | 252/312 |

*Primary Examiner*—Nathan M. Nutter
*Attorney, Agent, or Firm*—Thompson Hine & Flory LLP

[57] ABSTRACT

An improvement is produced in prior art processes for the continuous production of emulsions; the processes include the step of continuously combining volumetrically determined amounts of the hydrophobic phase and the hydrophilic phase in mixing apparatus in a volume ratio of about 45 to 95 percent hydrophobic phase to about 5 to 55 percent hydrophilic phase wherein the particle size of the emulsion is controlled by adjusting the volume ratio within the aforesaid ranges; the process is particularly useful as the emulsification step of a process for forming microcapsules.

20 Claims, 2 Drawing Sheets

CONTINUOUS PRODUCTION OF EMULSIONS AND MICROCAPSULES OF UNIFORM PARTICLE SIZE

BACKGROUND OF THE INVENTION

The invention relates to a continuous process for preparing oil in water emulsions and, more particularly, to a process for controlling the particle size of the emulsion within a comparatively narrow particle size range. The invention includes as one embodiment a process for preparing microcapsules characterized by having a substantially uniform size distribution. The latter process yields microcapsules having a median particle size (diameter) of about 4 to 25 microns which are suitable for use in making carbonless papers.

For purposes of this application, the median microcapsule size is on a volume basis. That is, 50% of the volume of hydrophobic core material is contained within microcapsules below the median microcapsule size and 50% of the material is contained within microcapsules above the median microcapsule size.

In a preferred embodiment, the hydrophobic core material contains a chromogenic material dissolved therein and paper coated with these microcapsules can be used as a self-contained or transfer carbonless copy paper. The chromogenic material may be a color precursor, color developer or color former.

U.S. Pat. No. 3,565,817 issued on Feb. 23, 1971 to Lissant discloses a method of preparation of emulsions in which the volume of internal phase is greater than that of the external phase. Lissant made his high internal phase ratio emulsions continuously by (1) preparing a preformed emulsion of approximately the same character, (2) introducing into the preformed emulsion both internal and external phases while maintaining the emulsified mass in a state of continuous shear and (3) withdrawing the prepared emulsion at the desired rate. Care was exercised not to maintain the shear above the shear stability point of the emulsion. Thus in Lissant's method he could not use colloid mills and similar high shear devices. No attempt was made to produce solid walled microcapsules.

U.S. Pat. No. 3,812,057 issued May 21, 1974 to de la Torriente et al. and U.S. Pat. No. 3,816,331 issued Jun. 14, 1974 to Brown et al. disclose continuous processes and apparatus therefor for preparing the microcapsules by coacervation by pumping the necessary ingredients for encapsulation through a conduit in turbulent flow. The ingredients may be introduced into the manufacturing conduit in the form of a premix of all ingredients as in de la Torriente et al. or at separate stages as in Brown et al.

Processes and apparatus which can be operated continuously to produce microcapsules are disclosed in U.S. Pat. No. 3,015,128 to Somerville; U.S. Pat. No. 3,160,686 to Doyle et al.; U.S. Pat. No. 3,202,533 to; Sachel et al.; U.S. Pat. No. 3,310,612 to Somerville; U.S. Pat. No. 3,423,489 to Arens et al.; U.S. Pat. No. 4,218,409 to Dannelly.

SUMMARY OF THE INVENTION

The process of this invention is continuous and involves the use of known high shear mixers, such as a colloid mill, which have a relatively small volumetric capacity comprised mainly of a zone or zones of high shear. By introducing a hydrophobic phase continuously and simultaneously with a hydrophilic phase into the zone of high shear, an emulsion having a high volume of droplets of hydrophobic phase of substantially uniform size can be made. The hydrophobic phase comprises about 45% to about 95% of the combined hydrophobic and hydrophilic volume of liquid being introduced into the zone of high shear, the remaining about 5% to about 55% being the hydrophilic phase. In accordance with the invention, the particle size of the emulsion is controlled by adjusting the oil to water volumetric ratio as contrasted with adjusting the shear energy as is commonly practiced in the art.

When the emulsification technology disclosed herein is used to produce an emulsion for forming microcapsules, the microcapsules produced are substantially uniformly sized. Microcapsules having a median particle diameter of about 4 microns to about 25 microns with a standard geometric deviation of less than 1.2 can be easily produced. The standard geometric deviation is a measure of uniformity of size of the microcapsules. A standard geometric deviation of 1 would be indicative of microcapsules having a completely uniform size. Standard geometric deviations of about 2 to about 3 are normal for microcapsules made by commercial batch processes. Median diameter and standard geometric deviation values are calculated using the method described hereinafter in Example 1.

The process of the instant invention comprises continuously combining volumetrically determined amounts of S the hydrophobic phase and the hydrophilic phase in a mixing apparatus adapted to provide a zone or zones of high shear such that the desired dispersion of the hydrophobic phase droplets in the hydrophilic phase is obtained within a time period of less than 5 seconds and, preferably, from about 0.01 to 0.5 second from the moment of combination and without the necessity for multiple passes through the mixing apparatus. The volumetric addition is in a volume ratio of 45 to 95 percent hydrophobic phase to 5 to 55 percent hydrophilic phase. The preferred mixing apparatus is a modified colloid mill which has a small retention capacity and a symmetrical design which provides a plurality of zones or more specifically, a zone wherein emulsification occurs in stages with one stage following another in very rapid succession such that high shear is applied to all portions of the dispersion.

Microcapsules produced by the process of this invention do not have the disadvantages associated with commercial processes which produce wide particle size distributions having large numbers of both extremely small and extremely large microcapsules. In coating particularly on paper, the smaller, undersized microcapsules penetrate the interstices between the fibers and do not rupture on the application of pressure, thus the intended function of these small microcapsules is lost. In the case of pressure-sensitive copy papers, this requires a heavier coating of microcapsules to give the same intensity of image. On the other hand, the large, outsized microcapsules contribute to poor smudge resistance as these large microcapsules are easily ruptured by abrasive action.

It is an object of this invention to provide a process of continuously forming an oil in water emulsion in which the hydrophobic phase is about 45 to 95% and the hydrophilic phase is 5 to 55% by volume and the particle size of the emulsion is controlled by adjusting the oil to water ratio within the aforesaid ranges.

It is another object of the invention to provide a process for forming microcapsules of substantially uniform size useful in the production of microcapsule coated papers.

It is another object of this invention to provide a process of making microcapsules having a median diameter and a standard geometric deviation which permits economical use of the microcapsules in producing pressure-sensitive carbonless copy papers of improved cost efficiency and resistance to smudge.

The emulsification process described herein can be used in any application in which uniformly sized particles are desired. It can be used to form emulsions useful in preparing microcapsules by any known process. In one of the preferred embodiments, the process of the present invention is used in conjunction with an interfacial microencapsulation process for the continuous production of substantially uniformly-sized microcapsules wherein a hydrophobic phase containing a first wall-forming reactant dispersed in an oil is combined with a hydrophilic phase containing an emulsifying agent and a second wall-forming reactant co-reactive with the first wall-forming reactant. (Those skilled in the art will appreciate that the first and second wall-forming reactant may be a mixture of reactants. In particular, a mixture of isocyanates is often used as the first wall-forming reactant.) The emulsifying agents are generally known as protective colloids. These processes include the steps of combining the hydrophilic and hydrophobic phases to form an emulsion. The emulsion is agitated for a period of time sufficient to provide a dispersion of hydrophobic phase droplets in a continuous phase of said hydrophilic phase. Microcapsule walls are then formed interfacially by the reaction of the first wall-forming reactant and the second wall-forming reactant to provide a dispersion of microcapsules in said hydrophilic phase. Microcapsules are preferably produced by interfacial reaction in which a polyfunctional isocyanate as the preferred reactant in the hydrophobic phase. A co-reactant for the isocyanate is used in the hydrophilic phase. For example, DETA is preferably added after the initial emulsification.

BRIEF DESCRIPTION OF THE DRAWINGS

In the drawings, FIG. 1 graphically illustrates the effect of the percent volume of internal (hydrophobic) phase during emulsification on the microcapsule size distribution as represented by the standard geometric deviation.

DETAILED DESCRIPTION OF THE INVENTION

It has been found that in oil in water systems containing a high volume of oil as compared to water, the emulsion particle size can be controlled within a narrow range by adjusting the volume ratio of the oil (or hydrophobic phase) to water (or hydrophilic phase). The emulsifying agent used and the residence time of the emulsion in the zone of high shear will also contribute to the result achieved. As used herein, the residence time is the time period from the moment of combination of the hydrophobic and hydrophilic phases while entering the milling machine to the moment the desired hydrophobic droplet size is reached in the emulsion.

Using the improved process of this invention, emulsions of substantially uniform size are produced when the hydrophobic phase constitutes about 45% to 95% by volume of the mixture of hydrophobic and hydrophilic phases. The remainder of the mixture is the hydrophilic phase. A range of about 52% to 90% is preferred and a most preferred range is about 60% to 80%. At 60 to 80% hydrophobic phase, particles having a size distribution with a standard geometric deviation below about 1.2 are easily obtained. All of the oil and water percentages herein are volume percentages.

Figure 1:
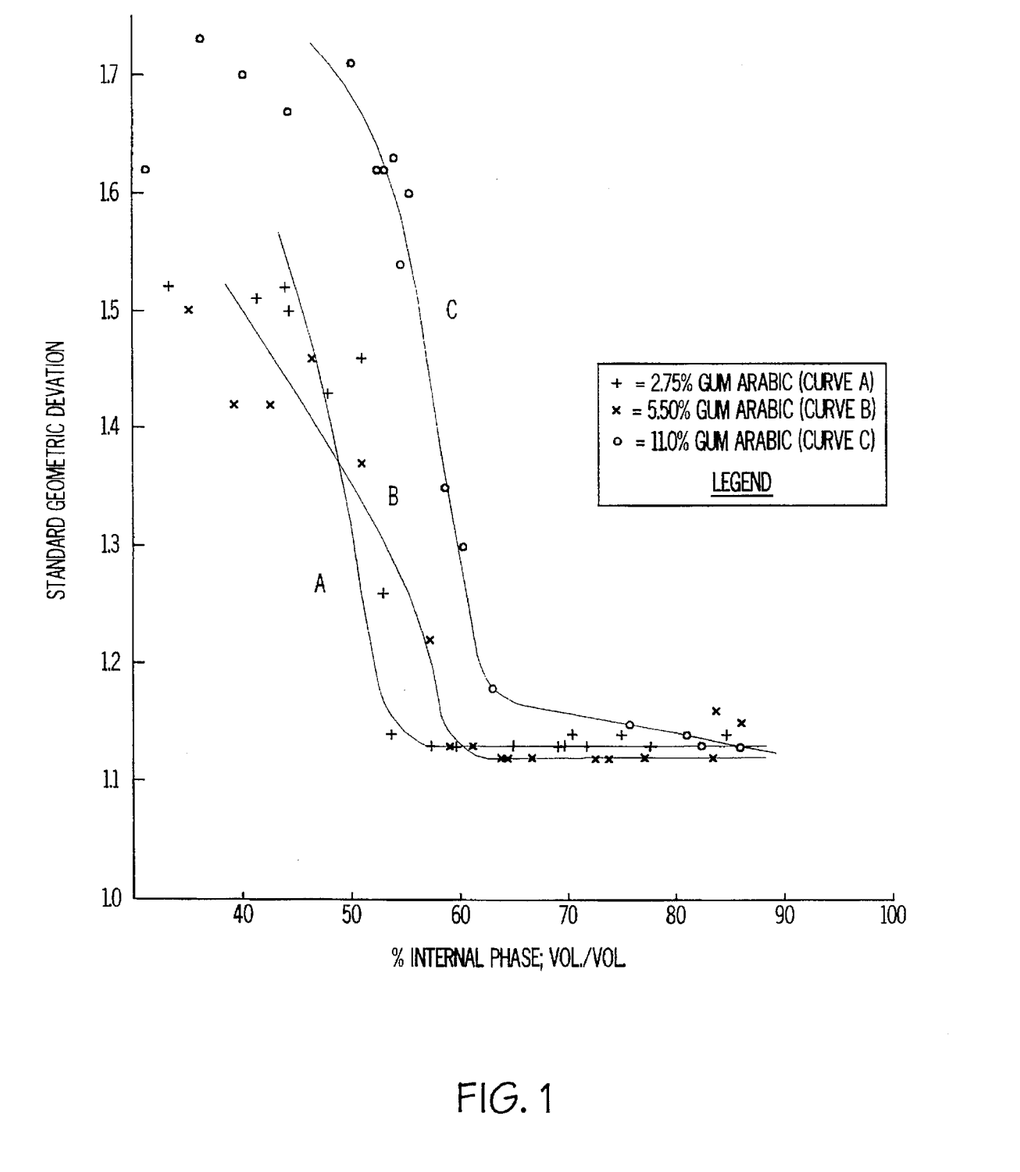
Figure 2:
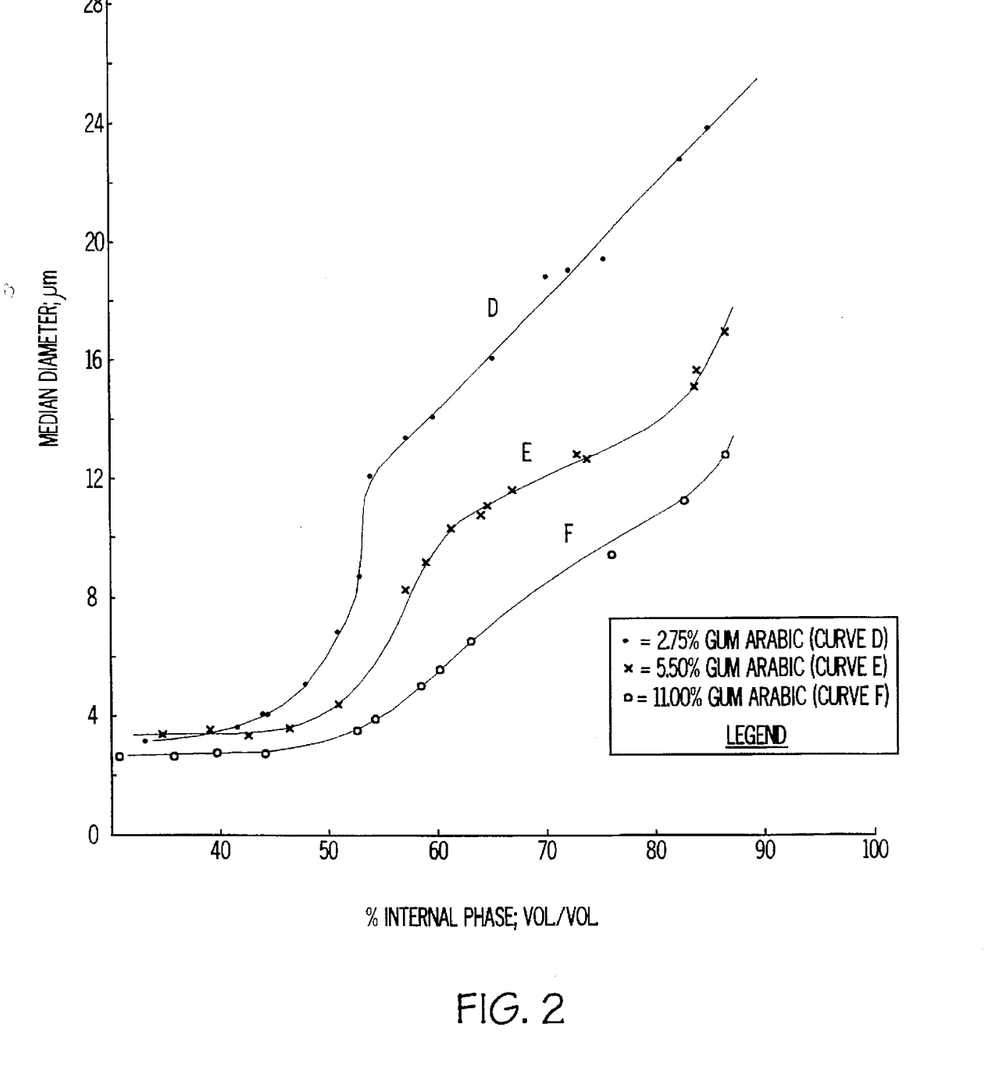
FIG. 2 graphically illustrates the effect of the percent volume of internal (hydrophobic) phase on the median diameter of the microcapsules.

The effect of the oil phase volume on particle size is shown in FIGS. 1 and 2. As shown in FIG. 1, as the volume of the oil phase increases in excess of 55% and especially 60%, the size distribution becomes very uniform with a standard geometric deviation less than 1.2. At these high oil phase volumes, the median particle size increases as the oil phase volume increases as shown in FIG. 2. Accordingly, by selecting oil phase volumes in excess of 55 and preferably 60%, a median particle size can be obtained with a narrow size distribution. In making emulsions in accordance with the present invention, the particle size of the emulsion is monitored, and the particle size of the emulsion can be tuned with high particle size uniformity by increasing or decreasing the amount of oil phase in the emulsion. Accordingly, one manifestation of the invention is a process wherein high volumes of oil within the aforesaid ranges are dispersed in water and the particle size is adjusted by controlling the oil phase to water phase ratios in accordance with established calibration curves such as shown in FIGS. 1 and 2.

Examples of the emulsifying agents useful in the practice of this invention are polyols and are generally known as protective colloids. Examples of these include gum arabic, hydroxypropylcellulose, ethylated starches, polyvinyl alcohol, carboxymethylcellulose, hydroxymethylcellulose and mixtures thereof. Of these, the preferred emulsifying agent is gum arabic.

One of the disadvantages of the prior art batch processes was the variation in shear conditions throughout the batch during formation of the emulsion. This was apparently due in part to a somewhat random circulation and recirculation of the mixture being emulsified through the zone of highest shear as, in this case for example, the zone produced near a rapidly rotating mixer blade. This variation in shear conditions throughout the batch gave rise to a wide deviation in size of the droplets of internal core material and thus resulted in emulsions and microcapsules having a wide variation in size. The process of the instant invention minimizes this deviation by using a single relatively small zone of high shear with high impact shearing action throughout this zone and no recirculation through the high shear zone. A residence or dwell time of 0.01 seconds to 5 seconds in a high shear zone has been found to be satisfactory. A preferred residence time is less than about 0.5 seconds. In this manner each unit volume of the emulsion experiences the same shear.

Among the considerations for selecting the mill are: (1) minimization of the volume of the shear zone, (2) the exclusion of entrained air, (3) pressurizability of the shear zone, and (4) a very high shear rate. It is important to have a small milling chamber so that all emulsion droplets are forced to pass through identical shear fields, and the residence time of the oil droplets after the size reduction has been accomplished is minimized. For example, shear rates of the order of $2 \times 10^5$ sec.$^{-1}$ may be used in the process of this invention. This shear rate can be achieved in a 2 inch Gaulin rotary colloid mill having a capacity of about 2.5 cubic centimeters at a throughput rate of about 2.5 liters per minute or a 4 inch mill having a capacity of 10 cc with a throughput rate of about 10 liters per minute. The inlet ports for introduction of the two phases should be as close to each other as is feasible. Location of the inlet ports should be in the "eye" of the rotary impeller blades. Thus, the shearing forces on any part of the hydrophobic phase are uniform and the resultant hydrophobic particles are substantially uniform in size.

A number of milling rotor parameters have been investigated using both the laboratory and pilot plant machines.

These have included the length, diameter, tip speed, surface texture, and perimeter tooth count (i.e., the frequency of pulsations generated in rotation). The most significant effect of parameter variables that has been found involves the rate at which milling is accomplished, as opposed to the characteristics of the resulting particle size distributions. In general, those rotor modifications which have resulted in increasing the efficiency with which the energy of the rotor is coupled into the fluid, as evidenced by the rate of temperature rise in the emulsion and the electrical power consumption, result in proportionately faster milling rates. This implies that, for purposes of predicting the performance, each rotor design could probably be characterized by a measured friction factor. While conventional theories of fluid mechanics predict that tip speed will be a variable of dominant influence, this was not found to be the case over the region of variation studied.

The process of this invention provides for close control of the median particle size (and hence the median microcapsule size in microencapsulation processes) as measured by volumetric size distribution. In this process, the relative volume of internal hydrophobic phase to hydrophilic continuous phase plays the principal role in controlling size and size distribution. The concentration of the emulsifying agent used in the hydrophilic phase and the temperature of the emulsion can also be used, in conjunction with the oil to water ratio, to control size and distribution. (The rate of shear applied to the emulsion mixture is typically held constant.) Increasing the relative volume of the hydrophobic phase increases the median particle size. Increasing the concentration of the emulsifying agent decreases the median particle size. Increasing the temperature of the emulsion also decreases the median particle size. To a much lesser extent, increasing the rate of shear can decrease the mean particle size by narrowing the particle size distribution. Thus, production of emulsions and microcapsules of a desired median diameter can be accomplished by proper choice of the variables noted above in conjunction with the oil to water phase ratio.

As heretofore mentioned, the process of this invention involves the formation of microcapsule walls. The wall forming process can be selected from those wall forming processes known in the art such as coacervation, in situ polymerization and interfacial polymerization.

A method known to be widely commercially used for the production of a microcapsules containing oils using coacervation is disclosed in U.S. Pat. No. 2,800,457, issued Jul. 23, 1957 to Green et al. The process described therein involves the coating of oil droplets with a liquid wall of gelatin/gum arabic colloidal material produced by coacervation. The liquid wall thus formed is hardened by treatment with formaldehyde.

U.S. Pat. No. 3,270,100 issued Aug. 30, 1966 to Jolkovski et al. and U.S. Pat. No. 3,464,926 issued Sep. 2, 1969 to Vandegaer et al. disclose processes of producing microcapsules by interfacial reaction of at least two wall-forming reactants, a first wall-forming reactant being dispersed in droplets of a hydrophobic core material and a second wall-forming reactant, co-reactive with the first wall-forming reactant, being dispersed in the hydrophilic continuous phase.

Pairs of wall-forming reactants suitable for use in the formation of microcapsule walls by interfacial reaction are disclosed in Table 2 of U.S. Pat. No. 3,432,327, issued Mar. 11, 1969 to Kan et al. The use of any particular reactant pair is not critical to this invention. However, reactant pairs most desirable in this process are those that react rapidly on contact to form a solid wall between the hydrophobic and hydrophilic phases. Reactant pairs which are useful in this invention include polyfunctional isocyanates with water, polyols and/or polyamines, and polyfunctional acyl, phosphoryl and sulfonyl chlorides with polyamines. The use of polyfunctional isocyanates as a first wall-forming reactant with a water solution of a polyfunctional amine such as diethylene triamine (DETA), as the predominate co-reactant is preferred. Both the water and the polyols react, as well, with the polyfunctional isocyanates to give a polyurea wall. The use of polyisocyanates with hydroxypropylcellulose is specifically disclosed in U.S. Pat. No. 4,025,455 issued May 24, 1977 to Shackle and commonly assigned to the assignee of this invention.

The polyfunctional isocyanates useful in the process of this invention include, in addition to the polyfunctional compounds such as the di- and tri-functional compounds, prepolymers containing more than one isocyanate group per molecule. Examples of preferred polyisocyanate prepolymers are as follows:

| Trade Name and Source | Chemical Description |
|---|---|
| Colonate HL-Nippon Polyurethene Co. | 75% solution in ethyl acetate of hexamethylene diisocyanate-trimethylolpropane prepolymer in 3 to 1 molar ratio. |
| Conap CP-6242-Conap, Inc. | 80% solution in ethyl acetate of a prepolymer of tolulene diisocyanate-dipropylene glycol in 2 to 1 molar ratio. |
| Desmodurs N-3200 & N-100 Miles, Inc. | Liquid biurets made by reacting hexamethylene diisocyanate with water in 3 to 1 molar ratio. N-3200 has a lower viscosity than does N-100. |
| Mondur CB-75-Miles, Inc. | 75% solution in ethyl acetate of a prepolymer of tolulene diisocyanate and trimethylolpropane. |
| Mondur MRS-Miles, Inc. | A polymethylene polyphenylisocyanate. |
| PXI SF-50 BASF Corp. | A trifunctional aromatic polyurethane prepolymer. |

When used to prepare microcapsules, the process of this invention includes the preparation of separate hydrophobic and hydrophilic phases followed by emulsification of the hydrophobic phase into the hydrophilic continuous phase, said emulsification being followed by formation of solid microcapsule walls.

In forming the walls by interfacial polymerization, the hydrophobic phase is prepared by dispersing the first wall-forming reactant of a reactant pair in an oil. Any water immiscible oil or oil mixture of relatively low viscosity which is also a suitable solvent for the isocyanate may be used in the hydrophobic phase. If the microcapsules are to be used in preparing pressure-sensitive carbonless transfer papers, the oil solution must be capable of dissolving any of the chromogenic materials, e.g., color precursors and color developers, which are normally present. In this embodiment, useful oils would include the alkylbiphenyls such as monoisopropylbiphenyl, alkylnaphthalenes, chlorinated paraffins, hydrocarbon oils such as kerosene, mineral oil and petroleum naphtha and mixtures thereof.

The first wall-forming reactant is present in the hydrophobic phase in an amount which may conveniently be 1% to 10%, preferably 3% to 8%, by weight, of the hydrophobic phase. The chromogenic material, if desired, may be present in the amount of 0.5% to 20%, by weight, of the hydrophobic phase.

The hydrophilic phase is prepared by dispersing any of the aforementioned emulsifying agents, preferably gum arabic, in water. The emulsifying agent may be present as an aqueous solution containing from 0.7% to 15%, preferably 2% to 10%, by weight, of the emulsifying agent. The useful emulsifying agents contain hydroxyl groups and thus together with water present in the hydrophobic phase acts as a second wall-forming reactant if the first wall-forming reactant is a polyfunctional isocyanate, thus forming polyurea microcapsule walls with the polyfunctional isocyanate. Other polyols and/or polyamines may additionally be present to react with the polyfunctional isocyanates. Amines may also be used if polyacyl, sulfonyl, or phosphoryl chlorides are present as the first wall-forming reactant. The use of a polyfunctional amine or other predominant co-reactants as the second wall-former may be present in the hydrophilic phase prior to combining the hydrophobic and hydrophilic phases; however, it is preferred to add the polyfunctional amine or other predominate co-reactant to the emulsion immediately following formation of the emulsion provided by the combination of the two phases.

Inversion of the emulsion can be prevented by pumping some of the continuous hydrophilic phase into the mixing chamber prior to starting the hydrophobic phase pump. Temperature of the emulsion as removed from the zone of high shear can be from 10° to 100° C., preferably 35° C. to 70° C.

The wall-forming reactants in the hydrophobic phase and the hydrophilic phase, react to form incipient solid microcapsule walls thus adding to the stability of the emulsion. The preferred method is to continuously inject and blend a dilute polyfunctional amine solution into the exhaust stream of the emulsifying mill. The microcapsule wall continues to form even after the emulsion is removed from the emulsification chamber and the partially formed microcapsules are transferred to a holding tank where they are mildly agitated to prevent aggregation of the microcapsules. Dilution water may be added to reduce the relative volume of microcapsules and thus reduce the viscosity of the slurry prior to the holding tank. The microcapsule walls may be treated with other wall-forming materials to strengthen and/or harden the walls.

The thus formed and treated microcapsules can be continuously withdrawn or used in batches for the preparation of microcapsule-containing coating compositions. Aqueous (slurries) containing 50%, by weight, or higher of finished microcapsules can be easily produced. With the optional addition of a binder for the microcapsules and stilt material, to prevent premature rupture of the microcapsules, coating slurries of unconventionally high solids can be made.

Because of the small amount of water present in the microcapsules dispersions produced by the process of this invention, use of these dispersions for making coating compositions containing a hot melt binder are advantageous particularly where the aqueous continuous phase is exchanged for a hot melt continuous phase by vacuum removal of the heated aqueous phase. Such a phase exchange process is disclosed claimed in U.S. Pat. No. 4,171,981 issued Oct. 23, 1979 to Austin et al, and assigned to the assignee of this invention.

As heretofore noted, microcapsules can be continuously produced by the process of this invention. Likewise, the microcapsules produced by this invention can be continuously dispersed in a continuous hot melt phase by the phase exchange process disclosed in U.S. Pat. No. 4,171,981 noted above. Thus, a process is available for continuously producing coating compositions containing microcapsules and a hot melt binder starting with a hydrophobic (oil) phase containing a wall-forming reaction and a hydrophilic phase containing a co-reactant for the wall-forming reactant in the hydrophobic phase. Production of coating compositions in this continuous manner can be modulated to conform with the demand for the composition in a microcapsule coating operation.

The following examples further illustrate this invention and the advantages obtained thereby without limiting the scope of the invention. Unless otherwise noted, the parts are by weight.

EXAMPLE 1

The objective of this series of encapsulation runs was to demonstrate the relationship between the internal phase ratio of the emulsion and the size distribution characteristics of the resulting microcapsules, over a continuous region. The scope of this trial series was confined to that region wherein the internal phase would constitute not less than 40%, nor more than 90% of the total volume of the emulsion in the samples produced.

The internal phase solution was prepared by dissolving 416 parts of crystal violet lactone (CVL), 642 parts of Desmodur N-100 isocyanate, 233 parts of SF-50 isocyanate, and 3240 parts of deodorized kerosene in 12,970 parts of monoisopropylbiphenyl (MIPB). The MIPB was initially heated to 95° C., then the CVL was mixed in and allowed to stir, with maintenance of the elevated temperature, for 60 minutes prior to adding the other constituents. The heat input to the oil was discontinued at the conclusion of the CVL dissolution period and the solution temperature was progressively depressed by the addition of each of the remaining constituents. The temperature of the internal phase solution at the mill inlet was 30° during the milling trial.

The external hydrophilic phase solution was prepared by diluting 3,800 parts of a 20% solids (air dry basis) filtered aqueous solution of gum arabic to a total of 13,820 parts using deionized water. This formed a 5.5% solids (air dry basis) solution which had a temperature of about 22° C. at the mill inlet throughout the trial.

A modified Model LP, Gaulin colloid mill was used as the emulsifying device in this trial. This mill has a 2-inch diameter conical rotor, driven at approximately 19,000 rpm, to a peripheral speed of 10,000 fpm by a 2 hp, 3,600 rpm synchronous, 3-phase motor, through a gearbox. The clearance between the rotor and stator was maintained at 10 mils. Under these conditions, the average shear rate was calculated to be in the order of $2 \times 10^5$ sec.$^{-1}$. The modifications made to the original colloid mill consisted of replacing the rotor-housing faceplate and eliminating the exhaust recirculation feature. Thus, the colloid mill was adapted for single passing milling. The original faceplate was replaced by one having identical internal contours, but which was center bored and tapped to accept a ¼ inch MNPT Swagelok male run tubing tee. The male run tee provides for the introduction of each of the emulsion phases at the eye (i.e., the geometric center of rotation) of the rotor face by delivering them through concentric tube terminations.

A positive displacement pump was used to transfer each of the emulsion phases from their respective reservoirs, through calibrated, adjustable flow regulators, to the colloid mill. These flow regulators were simultaneously adjusted, periodically, throughout the trial in a manner designed to incrementally increase the internal phase ratio of the emulsion being produced while holding the total mass flow rate through the mill at a constant value of 1,030 grams per minute.

Following each of the re-settings of the phase flow regulators, an emulsion sample was collected at the mill exhaust port and placed in an airtight container. The collection period of each sample was carefully timed so that subsequent weighings could be used to verify the actual mass flow rate through the mill at the time of sampling. A total of seventeen emulsion specimens (samples A through S) were thus collected over the duration of the series of runs. All of these samples were subsequently weighed then placed in a laboratory constant temperature water bath at 70° C. for 3 hours to enhance the microcapsule wall formation.

Following this wall curing cycle, the moisture content was determined by loss in weight on evaporation of the water from the continuous phase and the microcapsule size distribution characteristics were determined for each sample using a Coulter Counter Model T A II. Using the moisture content data, and assuming an internal phase density of 0.963 grams per milliliter, the % volume of the internal phase for each of the samples was derived by computation. The standard geometric deviation was determined graphically using the procedures disclosed in an article by C. E. Lapple entitled "Particle-Size Analysis and Analysers", *Chemical Engineering*, Vol. 75, No. 11, May 20, 1968, pp. 149–156. Using the cumulative size distribution curve as determined by Coulter Counter analyses, the median diameter corresponds to the 50% cumulative size and the standard geometric deviation is the ratio of the 84.13% smaller than, or the 15.87% larger than cumulative size to the 50% cumulative size. The results of the determinations are given in the following Table I.

TABLE I (5.5% Gum Arabic)

| Sample Identification | Median Particle Diameter[1] in Microns | Volume of Internal Phase[2], % | Standard Geometric Deviation[3] |
|---|---|---|---|
| A | 3.4 | 39.5 | 1.50 |
| B | 3.5 | 43.5 | 1.42 |
| C | 3.4 | 46.7 | 1.42 |
| D | 3.6 | 50.2 | 1.46 |
| E | 4.5 | 54.3 | 1.37 |
| F | 8.3 | 60.1 | 1.22 |
| G | 9.3 | 61.7 | 1.13 |
| H | 10.4 | 63.9 | 1.13 |
| J | 10.9 | 66.3 | 1.12 |
| K | 11.1 | 66.8 | 1.12 |
| L | 11.7 | 69.0 | 1.12 |
| M | 12.7 | 75.7 | 1.12 |
| N | 12.8 | 74.6 | 1.12 |
| P | 13.1 | 78.8 | 1.12 |
| Q | 15.1 | 84.7 | 1.12 |
| R | 15.7 | 85.0 | 1.16 |
| S | 17.0 | 87.2 | 1.15 |

[1]Equivalent spherical diameter, as determined by particle size distribution analysis using a Coulter Counter Model TAII.
[2]Determined from gravimetric moisture determinations, assuming an internal phase density of 0.963 gms/ml.
[3]Graphically determined using the definitions and procedures disclosed in the Lapple article.

EXAMPLE 2

A series of encapsulation runs was made and tested as described in Example 1, except that the external hydrophilic phase was prepared by diluting 8640 parts of a 20% solids filtered aqueous solution of gum arabic to a total of 15,760 parts using deionized water to give a 11% solids aqueous solution of gum arabic. The results of the determinations are given in Table II.

TABLE II

11% Gum Arabic

| Sample Identification | Median Particle Diameter[1] in Microns | Volume of Internal Phase[2], % | Standard Geometric Deviation[3] |
|---|---|---|---|
| A | 2.7 | 35.8 | 1.62 |
| B | 2.7 | 40.3 | 1.73 |
| C | 2.8 | 44.0 | 1.70 |
| D | 2.8 | 48.1 | 1.67 |
| E | 3.6 | 55.9 | 1.62 |
| F | 4.0 | 57.4 | 1.54 |
| G | 5.1 | 61.3 | 1.35 |
| H | 5.7 | 62.9 | 1.30 |
| J | 6.6 | 65.5 | 1.18 |
| K | 3.0 | 53.3 | 1.71 |
| L | 3.2 | 55.7 | 1.62 |
| M | 3.1 | 57.1 | 1.63 |
| N | 3.2 | 58.3 | 1.60 |
| P | 9.5 | 77.6 | 1.15 |
| Q | 10.9 | 82.4 | 1.14 |
| R | 11.3 | 83.7 | 1.13 |
| S | 12.8 | 87.2 | 1.13 |

[1]Equivalent spherical diameter, as determined by particle size distribution analysis using a Coulter Counter Model TAII.
[2]Determined from gravimetric moisture determinations, assuming an internal phase density of 0.963 gms/ml.
[3]Graphically determined using the definitions and procedures disclosed in the Lapple article.

EXAMPLE 3

A series of encapsulation runs was made and tested as described in Example 1, except that the external hydrophilic phase was prepared by diluting 4500 parts of a 11% solids aqueous solution of gum arabic to a total of 18,000 parts using deionized water to give a 2.75% solids aqueous solution of gum arabic. The results of the determinations are given in Table III.

TABLE III 2.75% Gum Arabic

| Sample Identification | Median Particle Diameter in Microns[1] | Volume of Internal Phase[2], % | Standard Geometric Deviation[3] |
|---|---|---|---|
| A | 3.2 | 37.8 | 1.52 |
| B | 4.1 | 47.9 | 1.52 |
| C | 3.7 | 45.6 | 1.51 |
| D | 4.1 | 48.2 | 1.50 |
| E | 5.1 | 51.4 | 1.43 |
| F | 6.9 | 54.2 | 1.26 |
| G | 8.8 | 56.1 | 1.26 |
| H | 12.2 | 57.0 | 1.14 |
| J | 13.5 | 60.2 | 1.13 |
| K | 14.2 | 62.3 | 1.13 |
| L | 16.1 | 67.3 | 1.13 |
| M | 18.9 | 71.8 | 1.13 |
| N | 18.3 | 71.2 | 1.13 |
| P | 18.8 | 72.3 | 1.14 |
| Q | 19.1 | 73.9 | 1.13 |
| R | 19.5 | 76.9 | 1.14 |
| S | 20.4 | 79.2 | 1.13 |

TABLE III-continued 2.75% Gum Arabic

| Sample Identification | Median Particle Diameter in Microns[1] | Volume of Internal Phase[2], % | Standard Geometric Deviation[3] |
|---|---|---|---|
| T | 22.8 | 83.7 | 1.13 |
| U | 23.9 | 85.9 | 1.14 |

[1]Equivalent spherical diameter, as determined by particle size distribution analysis using a Coulter Counter Model TAII.
[2]Determined from gravimetric moisture determinations, assuming an internal phase density of 0.963 gms/ml.
[3]Graphically determined using the definitions and procedures disclosed in the Lapple article.

Referring to FIG. 1, standard geometric deviation vs. percent volume of internal (hydrophobic) phase curves were plotted for continuous (hydrophilic) phases containing 2.75 to 11% gum arabic as follows: (The plotted values were obtained from Tables 1 through 3).

| Curve A | 2.75% Gum Arabic |
| Curve B | 5.5% Gum Arabic |
| Curve C | 11.0% Gum Arabic |

Curves A, B, and C disclosure that the standard geometric deviation of the particle size distribution is at a minimum above about 60 to 65% internal phase. This minimum standard geometric deviation is below 1.2 which value represents a narrow particle size distribution.

In FIG. 2, the median diameter vs. percent volume of internal (hydrophobic) phase curves were plotted for continuous (hydrophilic) phases containing 2.75 to 11% gum arabic as follows: (The plotted values were obtained from Tables 1 through 3).

| Curve D | 2.75% Gum Arabic |
| Curve E | 5.5% Gum Arabic |
| Curve F | 11.0% Gum Arabic |

The upward slope of all three curves confirms that above about 45% internal phase the median diameter increases as the percent internal phase increases. Also it is noted from the position of the curves that the increase in median diameter is greater as the percent gum arabic decreases.

Prior art manufacture of gelatine capsules used a maximum ratio of about 18 to 20% internal phase, whereas hydroxypropylcellulose/isocyanate microcapsules used a maximum ratio of about 40 to 45% internal phase.

EXAMPLE 4

An internal phase solution was prepared having the following composition:

| Material Used | Weight % of Internal Phase |
|---|---|
| MIPB Solvent | 73.77 |
| Color Precursors | 2.79 |
| Desmodur N-100 Isocyanate | 3.66 |
| SF-50 Isocyanate | 1.34 |
| Base H (Deodorized Kerosene) | 18.44 |

The color precursor was dissolved in the MIPB at about 90° C. and the two isocyanates added to the MIPB solution while still hot. The Base H diluent at room temperature was then added to the warm MIPB solution. The final solution temperature was about 60° C.

An external phase solution was prepared according to the following composition:

| Material Used | Weight % of External Phase |
|---|---|
| Gum Arabic | 10.07 |
| Water | 89.93 |

The gum arabic was dissolved in the water at room temperature.

The internal and external phase solutions as prepared above were milled in one pass through the modified colloid mill described in Example 1. The flow rate of the two phases through the mill was about 1066 grams per minute. The volume percent of the internal (hydrophobic) phase was about 69%. The exhaust temperature from the mill ranged from 52.7° C. to 60° C. The resultant microcapsules were diluted by addition of deionized water to 55.22% microcapsules, heated to 85° C. for about one hour after which the microcapsules were held overnight without further heat input. The temperature in the morning was about 50° C. Coulter Counter analysis disclosed the median particle diameter of the microcapsules to be 7.5 microns and the standard geometric deviation to be 1.2.

For comparison with the microcapsules of the invention as disclosed in Example 4, hydroxypropylcellulose microcapsules were produced according to the teachings of U.S. Pat. No. 4,025,455, noted supra. The internal phase was essentially the same as in Example 4 except that in the instant example, higher relative amounts of isocyanate were used. The final solution was cooled to 20° C. The formulation was as follows:

| Material | Weight % of Internal Phase |
|---|---|
| MIPB Solvent | 72.96 |
| Color Precursor | 2.96 |
| Desmodur N-100 Isocyanate | 6.08 |
| SF-50 Isocyanate | 2.00 |
| Base H (Deodorized Kerosene) | 16.00 |

The external phase was prepared according to the following composition:

| Material | Weight % of Internal Phase |
|---|---|
| Hydroxypropylcellulose | 3.10 |
| Water | 96.83 |
| Sodium Hydroxide | 0.07 |

The internal and external phases were pumped from separate supply tanks and were combined in-line and passed through a 6 inch Inline Agitator commercially available from Bench scale Equipment Co., Dayton, Ohio and back into the external supply tank from which it was recycled through the agitator. The Inline Agitator has a capacity of about 1.5 gallons and is equipped with a 6 blade impeller and was run at 5,000 rpm for 19 minutes during pumping in of the internal phase and at 6,500 rpm for 40 additional minutes during recirculation. The combined phases had a volume of 60 gals.

The resultant emulsion was cured by heating to 48° C. and holding for 3 hrs., under mild agitation. Heat input was discontinued and temperature allowed to decline slowly while stirring overnight in a reactor. This emulsion consisted of 40% internal phase and 60% external phase on a volumetric basis. The finished (i.e., cured) microcapsule slurry was 43.49%, by weight, microcapsules as determined by drying the slurry at 90° C. Coulter Counter analysis disclosed the median diameter of the microcapsules to be 7.0 microns and the standard geometric deviation to be 1.6.

Microcapsules from each of Example 4 and Comparative Example 1 were separately formulated into coating compositions containing 18% non-aqueous solids. The solids consisted of the following based on total solids:

|               |      |
|---------------|------|
| Microcapsules | 70%  |
| Starch Stilts | 25%  |
| Starch Binder | 5%   |
| Total         | 100% |

Each coating composition was applied at four different coat weights to a bond paper and thereafter dried.

The dried coated paper was tested by placing the coated surfaces thereof in contact with the coated side of a paper coated with metal modified novolak resin. These sheet couples were imaged with an electric typewriter using the character "m" in a repeating block pattern, and the intensity of the images was measured at the ratio of the reflectance of the imaged area to the reflectance of the unimaged background, after an elapsed time 10 minutes. Thus, the more intense or darker images show as lower values, and higher values indicate weak or faint images. This test is called Typewriter Intensity (i.e., T.I.) and may be expressed mathematically as $$T.I.=(100)(Ri/Ro)$$

where Ri is reflectance of the imaged area and Ro is reflectance of the background (unimaged) area as measured with a Bausch and Lomb Opacimeter.

Print speed was measured by imaging by one pass through a pair of calendar rolls with image intensity measured after 30 second development time. The lower the value reported, the faster the print speed.

The results are given in the following table:

TABLE IV

| Coated Paper No. | Active Coat Weight[1] | Typewriter Intensity | Print Speed | Standard Geometric Deviation |
|---|---|---|---|---|
| Comparative Example 1a | 1.52 | 67.3 | 74.4 | 1.6 |
| Comparative Example 1b | 1.86 | 63.7 | 69.4 | 1.6 |
| Comparative Example 1c | 2.56 | 60.3 | 67.0 | 1.6 |
| Comparative Example 1d | 2.82 | 58.7 | 65.9 | 1.6 |
| Example 4a | 0.87 | 68.0 | 73.2 | 1.2 |
| Example 4b | 1.30 | 60.0 | 62.8 | 1.2 |
| Example 4c | 1.76 | 56.3 | 60.5 | 1.2 |
| Example 4d | 2.19 | 54.7 | 60.5 | 1.2 |

[1]Pounds of microcapsules per 3300 square feet.

A comparison, for example, of Comparative Example 1b with Example 4c discloses that for nearly equal active coat weights both Typewriter Intensity and Print Speed are better for papers coated with the microcapsules from Example 4 which had a more uniform size distribution.

The ability to produce microcapsules of uniform size offers many advantages for current and potential product applications. Microcapsules of equal diameter are characterized by a uniformity of core volume, wall strength, wall thickness, and surface area since all of these qualities are a function of diameter. Practically all uses of microcapsules are dependent upon one or more of these physical qualities and predictable performance can be derived only through the control of these parameters.

What is claimed is:

1. A process for the continuous production of an emulsion having substantially uniformly-sized particles comprising dispersing a hydrophobic phase in a hydrophilic phase containing an emulsifying agent in a volume ratio of about 45 to 95% hydrophobic phase and about 5 to 55% hydrophilic phase, adjusting the volume ration of said hydrophobic phase to said hydrophilic phase to control the particle size of said emulsion, said step of dispersing being conducted with sufficient agitation to provide an emulsion of hydrophobic phase droplets in a continuous phase of said hydrophilic phase, the residence time in said mixing apparatus being about 0.01 seconds to 5 seconds.

2. The process of claim 1 wherein said step of dispersing is conducted in a single pass through a mixing apparatus adapted to provide one or more zones of high shear, the residence time in said mixing apparatus being less than about 0.5 seconds.

3. The process of claim 2 wherein said emulsifying agent is a polyol selected from the group consisting of gum arabic, hydroxypropylcellulose, ethylated starch, polyvinyl alcohol, carboxymethylcellulose, hydroxyethylcellulose and mixtures thereof.

4. The process of claim 3 wherein said polyol is gum arabic.

5. A process for the continuous production of substantially uniformly-sized microcapsules comprising dispersing a hydrophobic phase with a hydrophilic phase containing an emulsifying agent in a volume ratio of about 45 to 95% hydrophobic phase and about 5 to 55% hydrophilic phase to form an emulsion, said step of dispersing being conducted with sufficient agitation to provide a dispersion of hydrophobic phase droplets in a continuous phase of said hydrophilic phase; adjusting the volume ratio of said hydrophobic phase to said hydrophilic phase to control the particle size of said emulsion; and encapsulating said droplets in a wall former to provide a dispersion of microcapsules in said hydrophilic phase.

6. The process of claim 5 wherein said step of dispersing is conducted in a single pass through a mixing apparatus adapted to provide one or more zones of high shear, the residence time in said mixing apparatus being from about 0.01 seconds to 5 seconds.

7. The process of claim 6 wherein said step of encapsulating said droplets in a wall former includes forming a wall by interfacial polymerization wherein a hydrophobic phase containing a first wall-forming reactant is combined with a hydrophilic phase containing an emulsifying agent and a second wall-forming reactant is present in the hydrophilic phase or is added to said hydrophilic phase subsequent to forming said emulsion.

8. The process of claim 7 wherein said second wall-forming reactant is a polyfunctional amine.

9. The process of claim 8 wherein said polyfunctional amine is diethylene triamine.

10. The process of claim 9 wherein said first wall-forming reactant includes a polyfunctional isocyanate.

11. The process of claim 10 wherein said polyfunctional isocyanate includes a liquid biuret made by reacting hexamethylene diisocyanate with water in a molar ratio of 3 to 1.

12. The process of claim 5 wherein said emulsifying agent is a polyol selected from the group consisting of gum arabic, hydroxypropylcellulose, ethylated starch, polyvinyl alcohol, carboxymethylcellulose, hydroxyethylcellulose and mixtures thereof.

13. The process of claim 12 wherein said polyol is gum arabic and is present in amount of 0.7 to 15.0%.

14. The process of claim 5 wherein said first wall-forming reactant is present in said hydrophobic phase in an amount of about 1% to 10%, by weight, of said hydrophobic phase.

15. The process of claim 5 wherein said combined hydrophobic and hydrophilic phases contain about 60 to 80% of said hydrophobic phase with the remainder being the hydrophilic phase and said microcapsules have a median particle diameter of about 4 to 25 microns and a size distribution with a standard geometric deviation below about 1.2.

16. The process of claim 6 wherein said emulsion of said hydrophobic phase and said hydrophilic phase after passing through said mixing apparatus is in the temperature range of from 35° C. to 70° C.

17. A process for the continuous production of substantially uniformly sized microcapsules having a median particle diameter of about 4 to 25 microns and a size distribution with a standard geometric deviation below about 1.2 comprising continuously combining about 60 to 80% by volume of a hydrophobic phase containing a polyfunctional isocyanate, wherein said polyfunctional isocyanate is present in said hydrophobic phase in an amount of about 1 to 10 percent by weight of said hydrophobic phase; and about 20 to 40% by volume of a hydrophilic phase containing a polyol to form an emulsion, wherein, upon formation of said emulsion, about 5 to 65%, based upon the total weight of the isocyanates, of a polyfunctional amine is added to said emulsion, said emulsion being agitated for a period of time sufficient to provide a dispersion of hydrophobic phase droplets in a continuous phase of said hydrophilic phase, said hydrophobic and said hydrophilic phases being combined in a mixing apparatus adapted to uniformly apply a zone or zones of high shear to all portions of said dispersion such that said dispersion is obtained within a residence time of about 0.01 to 5 seconds without the necessity of multiple passes through said mixing apparatus, wherein said dispersion after passing through said mixing apparatus is in the temperature range of about 35° to 70° C., and wherein microcapsule walls are formed interfacially by the reaction of said polyfunctional isocyanate and said polyfunctional amine to provide a dispersion of said microcapsules in said hydrophilic phase.

18. The process of claim 17 wherein said polyfunctional isocyanate is a liquid biuret made by reacting hexamethylene diisocyanate with water in a molar ratio of 3 to 1.

19. The process of claim 1 wherein said step of dispersing is conducted at a shear rate of about $2 \times 10^5$ sec.$^{-1}$.

20. The process of claim 1 wherein said volume ratio is about 60 to 80% by volume of hydrophobic phase.

* * * * *